US011774938B2

(12) United States Patent
Straeussl

(10) Patent No.: US 11,774,938 B2
(45) Date of Patent: Oct. 3, 2023

(54) MONITORING DEVICE AND METHOD FOR OPERATING A MONITORING DEVICE

(71) Applicant: Bayerische Motoren Werke Aktiengesellschaft, Munich (DE)

(72) Inventor: Markus Straeussl, Aholfing (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 0 days.

(21) Appl. No.: 16/733,866

(22) Filed: Jan. 3, 2020

(65) Prior Publication Data

US 2020/0142381 A1 May 7, 2020

Related U.S. Application Data

(63) Continuation of application No. PCT/EP2018/065578, filed on Jun. 13, 2018.

(30) Foreign Application Priority Data

Jul. 4, 2017 (DE) ...................... 10 2017 211 301.4

(51) Int. Cl.
*G05B 19/406* (2006.01)
*G05B 19/401* (2006.01)

(52) U.S. Cl.
CPC ......... *G05B 19/406* (2013.01); *G05B 19/401* (2013.01); *G05B 2219/32* (2013.01)

(58) Field of Classification Search
CPC ........................... G05B 19/401; G05B 19/506
(Continued)

(56) References Cited

U.S. PATENT DOCUMENTS 4,787,136 A * 11/1988 Majic .................... B23P 19/066
29/709
2002/0038159 A1* 3/2002 Gass .................. G05B 19/4183
700/108
(Continued)

FOREIGN PATENT DOCUMENTS

DE           36 37 236 A1    5/1988
DE         102 15 885 A1   10/2003
(Continued)

OTHER PUBLICATIONS

Wikimedia Foundation, Wikipedia—Radio-Frequency Identification; Jan. 1, 2017 revision. Retrieved from http://web.archive.org/web/20170101220309/https://en.wikpedia.org/wiki/radio-frequency-identification (Year: 2017).*

(Continued)

*Primary Examiner* — Mohammad Ali
*Assistant Examiner* — Joshua T Sanders
(74) *Attorney, Agent, or Firm* — Crowell & Moring LLP

(57) ABSTRACT

A monitoring device is provided for a human or mechanical manipulator on which an operating element, such as a tool or a handling device, can be fixed and by which the operating element can be operated. The monitoring device has at least one detection device which includes at least one sensor, by which at least one actual value of the manipulator can be detected, and which detection device includes at least one control unit by which the actual value of the manipulator detected by the sensor can be matched to at least one desired value of the manipulator stored in the control unit. The detection device has at least one transponder element arranged on the operating element and/or on a working station in order to detect the actual value using the at least one sensor, which transponder element can be detected via the at least one sensor.

15 Claims, 2 Drawing Sheets

(58) Field of Classification Search
USPC .......................................................... 700/90
See application file for complete search history.

(56) References Cited

U.S. PATENT DOCUMENTS

| | | | |
|---|---|---|---|
| 2007/0005045 A1 | 1/2007 | Mintz et al. | |
| 2009/0210090 A1* | 8/2009 | Takemitsu | B25J 9/1661 |
| | | | 901/1 |
| 2009/0220124 A1* | 9/2009 | Siegel | G06T 7/292 |
| | | | 382/103 |
| 2010/0140345 A1 | 6/2010 | Sakamoto et al. | |
| 2011/0214890 A1* | 9/2011 | Wallgren | B25B 23/14 |
| | | | 173/2 |
| 2014/0200700 A1* | 7/2014 | Kamioka | H05K 13/0817 |
| | | | 700/110 |
| 2016/0008983 A1* | 1/2016 | Osaka | B25J 9/1692 |
| | | | 700/254 |
| 2017/0280446 A1* | 9/2017 | Itagaki | H04L 5/0048 |
| 2018/0239976 A1* | 8/2018 | Cornelius | G06F 1/163 |

FOREIGN PATENT DOCUMENTS

| | | | |
|---|---|---|---|
| DE | 10 2014 204 969 A1 | 9/2015 | |
| EP | 2 113 344 A1 | 11/2009 | |
| WO | WO 2015/140043 A1 | 9/2015 | |
| WO | WO-2015140043 A1 * | 9/2015 | ............. G06Q 50/04 |

OTHER PUBLICATIONS

International Search Report (PCT/ISA/210) issued in PCT Application No. PCT/EP2018/065578 dated Aug. 13, 2018 with English translation (six (6) pages).

German-language Written Opinion (PCT/ISA/237) issued in PCT Application No. PCT/EP2018/065578 dated Aug. 13, 2018 (six (6) pages).

German-language Search Report issued in counterpart German Application No. 10 2017 211 301.4 dated Mar. 26, 2018 with English translation (11 pages).

English translation of Chinese-language Office Action issued in Chinese Application No. 201880026522.5 dated Aug. 26, 2022 (10 pages).

English translation of Chinese-language Office Action issued in Chinese Application No. 201880026522.5 dated Apr. 28, 2023 (10 pages).

* cited by examiner

MONITORING DEVICE AND METHOD FOR OPERATING A MONITORING DEVICE

CROSS REFERENCE TO RELATED APPLICATIONS

This application is a continuation of PCT International Application No. PCT/EP2018/065578, filed Jun. 13, 2018, which claims priority under 35 U.S.C. § 119 from German Patent Application No. 10 2017 211 301.4, filed Jul. 4, 2017, the entire disclosures of which are herein expressly incorporated by reference.

BACKGROUND AND SUMMARY OF THE INVENTION

The invention relates to a monitoring apparatus for a human or mechanical manipulator to which an operator control element, such as a tool or handling device, is attachable and by which the operator control element is controllable, having at least one detection device that comprises at least one sensor, by means of which at least one ACTUAL value of the manipulator is detectable, and that comprises at least one control unit, by which the ACTUAL value of the manipulator detected by the sensor is associable with at least one SETPOINT value of the manipulator saved in the control unit. The invention also relates to a method for operating such a monitoring apparatus.

For industrial applications, for example for assembly line production, it is important for the operating personnel to follow a defined sequence of work steps. This defined sequence of work steps (known as a standard) is dependent on the product being manufactured in each case. In the case of production lines, for example, the operating personnel frequently work with changing products and are therefore confronted with frequently changing standards.

When there are new products on the production line, there is the likelihood of the necessary standards not yet being completely internalized by the operating personnel. As a result, interchange or omission of a work step can never be entirely ruled out.

Methods for logging and checking work steps are known from the prior art. By way of example, DE 102 15 885 A1 discloses automatic process inspection in which a real environment is detected by means of a work environment detection device. The latter involves the detected real work cycles being compared with virtually saved work cycles and automatically logged.

A discordance of real work cycles from virtual work cycles is detected only afterwards in this case, which has been found to be impractical.

An attempt has been made to overcome this problem in DE 10 2014 204 969 A1 by virtue of orientation SETPOINT values and position SETPOINT values being compared with orientation ACTUAL values and position ACTUAL values and output by way of a signal via an output device.

To detect the position ACTUAL values and the orientation ACTUAL values, complex cost-intensive sensors that monitor the work cycles are provided.

It is an object of one exemplary embodiment of the invention to provide a monitoring apparatus and a method for operating a monitoring apparatus that is of simple design and inexpensive.

This object is achieved for a monitoring apparatus cited at the outset by virtue of the detection device comprising, for the purpose of detecting the ACTUAL value by way of the at least one sensor, at least one transponder element, arranged on the operator control element and/or on a workstation, that is detectable by way of the at least one sensor.

As a result of the detection device comprising first the sensor and secondly the transponder element, the monitoring apparatus is producible simply and inexpensively.

The transponder is programmable for single frequencies and, as a result, easily associable with a workstation, an operator control element and the like.

The sensor can comprise for example an antenna element with which the transponder element is detectable and associable. As a result, it is not necessary to resort to complex sensors by which a movement or an orientation of the manipulator is detectable, but rather to simple feedback between the sensor and transponder element. If the respective transponder element and the ACTUAL value produced thereby corresponds to the saved SETPOINT value, it is easily and inexpensively detectable whether ACTUAL value and SETPOINT value are concordant.

The monitoring apparatus can comprise, for example, a radio frequency identification (RFID).

The manipulator can be a human operator or a robot.

It is found to be advantageous if the monitoring apparatus has at least one signal device by means of which a concordance and/or discordance of the ACTUAL value of the manipulator with or from the SETPOINT value of the manipulator is signalable on the manipulator.

As a result of the monitoring apparatus comprising a signal device by means of which a concordance or discordance of the ACTUAL value of the manipulator with or from the SETPOINT value of the manipulator is signalable, it is detectable on the manipulator whether an error has been made by the manipulator.

The ACTUAL values and SETPOINT values can include for example a specific place, a specific activity and/or a specific tool. If therefore the manipulator is at the wrong location, performs the wrong activity or uses the wrong tool, this is immediately signalable by the signal device. Accordingly, the manipulator is provided with a positive response by the signal device if ACTUAL value and SETPOINT value are concordant.

Further, the ACTUAL values and SETPOINT values can also include the detecting of a period of time. In such a case, a work step can be assigned a specific period of time. The picking up of a tool then activates a timer. When the tool is put back, the timer is stopped. If the period of time needed is below the SETPOINT period of time, an applicable response can then be signaled. Apart from this, the period of time can be a tolerance range within which the work step is performable in order to generate a positive response.

In a development of the latter embodiment, it is found to be advantageous if the signal device is attached to the manipulator indirectly or directly and is visually, audibly and/or physically perceptible and, in particular, comprises a light-emitting element, a loudspeaker element and/or a vibration element perceptible on the manipulator.

If the signal device comprises for example a visual signal device, this can be formed by one or more LEDs. By way of example, an LED shining green can signal a concordance of the ACTUAL values with the SETPOINT values (positive response) and an LED shining red can signal a discordance of the ACTUAL values from the SETPOINT values (negative response). Apart from this, the visual signal device can comprise a smartphone.

If the signal device comprises a physically perceptible signal device, a concordance or discordance of the ACTUAL values with/from the SETPOINT values can be physically perceptible, for example in the form of vibrations.

Fundamentally, it is contemplated that the detection device is, at least in part, arranged physically separately from the manipulator. By way of example, it is contemplated that the signal device is attached to a workstation at a fixed location.

However, it is found to be advantageous if the detection device is arrangeable or arranged on the manipulator directly or indirectly and/or if the detection device comprises at least one, in particular electrical, energy unit for supplying power to at least the control unit and the sensor, in particular the antenna element.

As a result of the detection device being arranged on the manipulator directly or indirectly, said detection device is usable in a versatile and flexible fashion. This is furthermore also supported by the fact that the monitoring apparatus comprises the energy unit. As a result, the monitoring apparatus is independent of a local energy supply. In addition to supplying power to the control unit and the sensor, the energy unit can also supply the signal device with energy, in particular electrical energy.

The ACTUAL value of the manipulator and/or the SETPOINT value of the manipulator can fundamentally comprise arbitrary values. It is found to be advantageous if the ACTUAL value of the manipulator and the SETPOINT value of the manipulator comprise at least one contact value, a position value, an orientation value, a movement value and/or a direction of movement value of the manipulator and/or the attachment and/or use of a defined operator control element of the at least one operator control element, which defined operator control element is saved in the control unit.

A contact value is understood below to mean that the sensor of the detection device comes into contact with the transponder element. This is not necessarily intended to be understood as direct physical contact, but rather is also understood as bringing the sensor into sufficient proximity to the transponder element, so that feedback, or detection of the transponder element by the antenna element, can take place.

Further, it is found to be advantageous if the monitoring apparatus comprises at least one inspection unit, to which at least the ACTUAL value of the manipulator, the concordance, and/or the discordance, is transferrable by the control unit by means of the sensor in the form of an antenna element, and possibly by a display of the inspection unit, by means of which the ACTUAL value of the manipulator, the concordance, and/or the discordance, is displayable.

In such a case, a concordance or discordance of the ACTUAL values from the SETPOINT values is signalable not only directly on the manipulator, but for example also on a central monitoring unit.

Apart from this, the object is achieved by a method for operating a monitoring apparatus, in particular having at least one of the aforementioned features, for a human or mechanical manipulator to which an operator control element, such as a tool or handling device, is attachable and by means of which the operator control element is controllable, which monitoring apparatus has at least one detection device that comprises at least one sensor and at least one control unit, and that comprises at least one transponder element arranged on the operator control element and/or on a workstation, having the steps of:

a. detecting at least one ACTUAL value of the manipulator by detecting a transponder element arranged on the operator control element or the workstation by way of the at least one sensor;

b. associating the ACTUAL value of the manipulator with a SETPOINT value of the manipulator by way of the control unit, in particular associating the ACTUAL value with a specific operator control element and/or with a specific workstation; and c. ascertaining a concordance or a discordance of the ACTUAL value of the manipulator with or from the SETPOINT value of the manipulator.

It is found to be advantageous if the method comprises signaling at least the discordance or the concordance of the ACTUAL value of the manipulator from or with the SETPOINT value of the manipulator by way of at least one signal device arranged on the manipulator.

The signal can be visually, audibly or physically perceptible.

Apart from this, it is found to be advantageous if the method comprises saving and/or storing the SETPOINT values, the concordance, and/or the discordance, in the control unit.

As a result, evaluation of the ACTUAL values by the control unit is rendered possible directly on the manipulator, and the monitoring apparatus is usable flexibly and anywhere.

Finally, it is found to be advantageous if the method comprises transmitting at least the ACTUAL values, the concordance, and/or the discordance, to an inspection unit and possibly displaying the ACTUAL values, the concordance, and/or the discordance, by way of a display of an inspection unit.

This allows additional monitoring by an external inspection unit.

Other objects, advantages and novel features of the present invention will become apparent from the following detailed description of one or more preferred embodiments when considered in conjunction with the accompanying drawings.

DETAILED DESCRIPTION OF THE DRAWINGS

Figure 1:
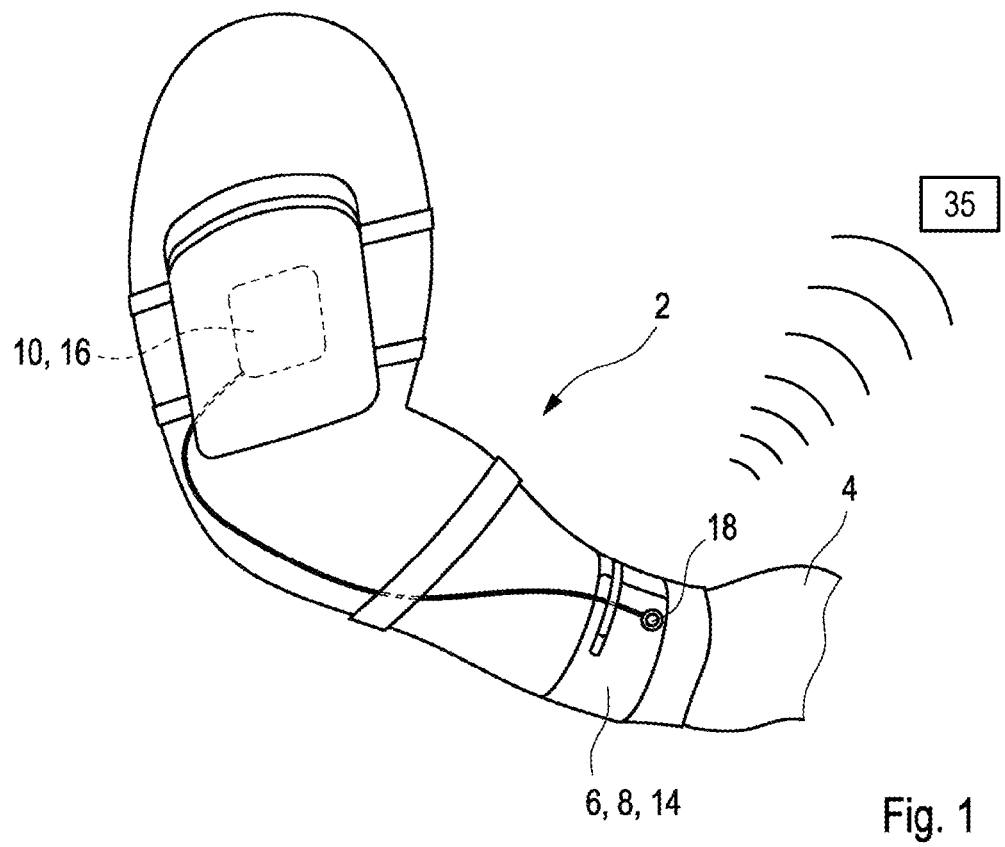
FIG. 1 is a perspective plan view of an exemplary embodiment of the monitoring apparatus.
Figure 2:
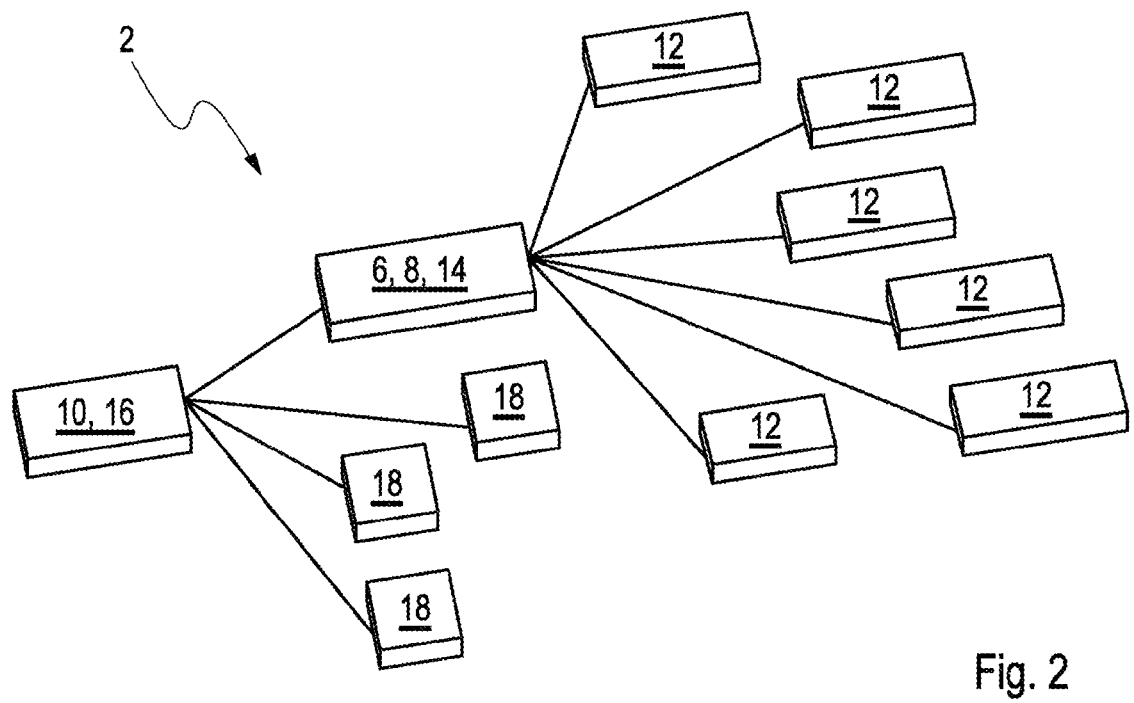
FIG. 2 is a schematic representation of the interaction of the individual parts of the monitoring apparatus shown in FIG. 1.

FIGS. 1 and 2 show a monitoring apparatus, the whole of which is provided with the reference sign 2, for a human or mechanical manipulator 4. An operator control element, such as a tool or handling device (not depicted in the figures), is attachable to the manipulator 4. In the exemplary embodiment shown in the figures, the monitoring apparatus 2 comprises a detection device 6 comprising at least one sensor 8. An ACTUAL value of the manipulator 4 is detectable by the sensor 8. Apart from this, the detection device 6 comprises a control unit 10 by means of which the ACTUAL value of the manipulator 4 detected by the sensor 8 is associable with at least one SETPOINT value of the manipulator 4 saved in the control unit 10. From FIG. 2, it is evident that the detection device 6 comprises multiple transponder elements 12 that are detectable by way of the sensor 8. In the exemplary embodiment of the monitoring apparatus 2 depicted in the figures, the sensor 8 includes an antenna element 14.

In the exemplary embodiment shown in the figures, the detection device 6 is attached directly to the manipulator 4.

Apart from this, the detection device 6 includes an energy unit 16 by means of which at least the control unit 10, the sensor 8, in particular the antenna element 14, are suppliable with energy. Moreover, the monitoring apparatus 2 includes a signal device 18 by means of which a concordance and/or discordance of the ACTUAL value of the manipulator 4 with/from the SETPOINT value of the manipulator 4 is signalable on the manipulator 4. In this case, the signal means 18 can be visually, audibly and/or physically perceptible.

Figure 3:
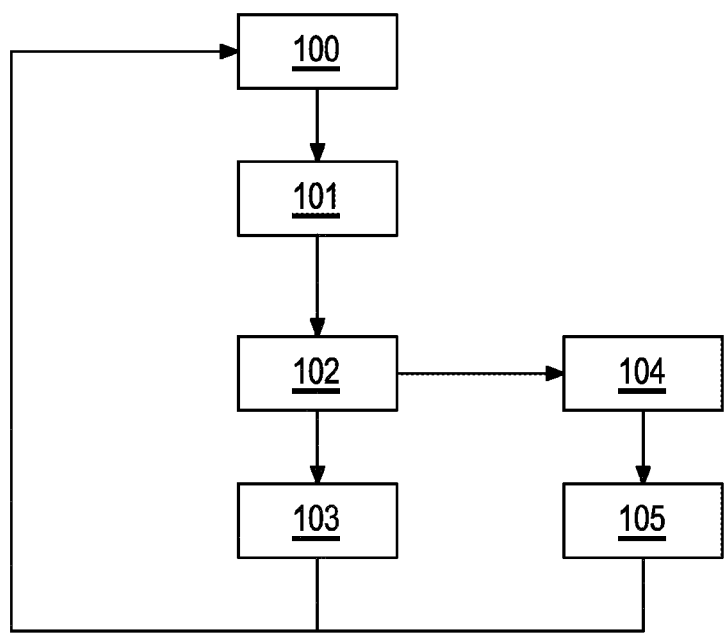
FIG. 3 is a schematic flowchart for a first embodiment of the monitoring apparatus.

FIG. 3 shows a schematic flowchart, on the basis of which the interaction of the individual components of the monitoring apparatus 2 shown in FIGS. 1 and 2 is explained below.

In a first step 100, at least one ACTUAL value of the manipulator 4 is detected by the sensor 8.

In a subsequent step 101, the ACTUAL value of the manipulator 4 is associated with a SETPOINT value of the manipulator 4 by the control unit 10. The SETPOINT values of the manipulator 4 are storable in the control unit 10 and can be used for comparison against the ACTUAL values.

In a subsequent step 105, a concordance or discordance of the ACTUAL value of the manipulator 4 with or from the SETPOINT values of the manipulator 4 is ascertained.

The signal device 18 signals the discordance or concordance of the ACTUAL value of the manipulator 4 with the SETPOINT value of the manipulator 4 in a subsequent step 103. As a result, it is detectable directly on the manipulator 4 whether the manipulator 4 is at the correct workstation, whether the manipulator 4 performs a correct work activity and/or whether the manipulator 4 uses the correct tool.

Apart from this, it is contemplated that, in parallel with work steps 102 and 103, saving and/or storage of the SETPOINT values, the concordance and/or the discordance in the control unit is savable in a work step 104.

In parallel with step 103, in which the signal device 18 signals to the manipulator 4 whether there is a concordance or discordance of the ACTUAL values of the manipulator 4 with the SETPOINT values of the manipulator 4, transmission of at least the ACTUAL values, the concordance and/or the discordance, to an inspection unit 35 is effected and, there, display of the ACTUAL values, the concordance and/or the discordance, by a display of the inspection unit is effected if need be.

LIST OF REFERENCE SIGNS

2 Monitoring apparatus
4 Manipulator
6 Detection device
8 Sensor means
10 Control unit
12 Transponder element
14 Antenna element
16 Energy unit
18 Signal means
100-105 Method steps The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A monitoring apparatus for a human operator to which an operator control element is attachable, the monitoring apparatus being configured to control the operator control element, the monitoring apparatus comprising:
    a detection device that comprises a sensor, by which a current actual value of the human operator is detectable;
    a control unit, by which the current actual value of the human operator detected by the sensor is compared with a previous value of the human operator saved in the control unit; wherein:
        the detection device is configured to detect the current value;
        the detection devices includes a first transponder element that is attached to the operator control element, and
        a second transponder element that is attached to a workstation, and
        signals from the first transponder element and from the second transponder element are detected by the same sensor;
    wherein the detection device is attached on the human operator directly or indirectly; and
    the detection device comprises at least one electrical energy unit for supply power to at least the control unit and the sensor.

2. The monitoring apparatus according to claim 1, further comprising:
    a signal device by which a concordance and/or discordance of the current actual value of the human operator with the previous value of the human operator is signalable to the human operator.

3. The monitoring apparatus according to claim 2, wherein the signal device is attached on the human operator indirectly or directly and is visually, audibly, and/or physically perceptible.

4. The monitoring apparatus according to claim 2, wherein the signal device is a light-emitting element, a loudspeaker, and/or a vibrator perceptible to the human operator.

5. The monitoring apparatus according to claim 1, wherein
    the energy unit supplies power to an antenna element of the sensor.

6. The monitoring apparatus according to claim 1, wherein the current actual value of the human operator and the previous value of the human operator comprise a contact value, a position value, an orientation value, a movement value and/or a direction of movement value of the human operator, and/or the attachment and/or use of a defined operator control element of the operator control element, which defined operator control element is saved in the control unit.

7. The monitoring apparatus according to claim 1, further comprising:
    an inspection unit, to which at least the current actual value of the human operator, a concordance and/or a discordance is transferrable by the control unit by way of an antenna element, and a display of the inspection unit, by which the current actual value of the operator, the concordance and/or the discordance is displayable.

8. The monitoring apparatus according to claim 1, wherein a tool or handling device is attachable to the human operator.

9. The monitoring apparatus according to claim 1, wherein the sensor is associated with at least one setpoint value of the human operator.

10. A method for operating a monitoring apparatus for a human operator to which an operator control element is attachable, the monitoring apparatus being configured to control the operator control element, which monitoring apparatus has a detection device that comprises a sensor and a control unit, and that comprises first and second transponder elements, the method comprising the steps of:
   a. detecting an actual value of the human operator by detecting the transponder element arranged on the operator control element or the workstation by way of the sensor;
   b. associating the actual value of the human operator with a previous value of the human operator stored in the control unit;
   c. determining a concordance or a discordance of the actual value of the human operator with or from the previous value of the human operator, wherein:
   the first transponder element is attached to the operator control element,
   the second transponder element is attached to a workstation, and
   signals from the first transponder element and from the second transponder element are detected by the same sensor, wherein:
      the detection device is attached on the human operator directly or indirectly, and the detection device comprises at least one electrical energy unit for supply power to at least the control unit and the sensor.

11. The method according to claim 10, wherein the step of associating the actual value of the human operator with a previous value of the human operator is carried out by associating the actual value with a specific operator control element and/or with a specific workstation.

12. The method according to claim 10, further comprising the step of:
   signaling the discordance or the concordance of the actual value of the human operator from or with the previous value of the human operator by way of a signal device arranged on the human operator.

13. The method according to claim 12, further comprising the step of:
   storing the setpoint values, the concordance or the discordance, in the control unit.

14. The method according to claim 13, further comprising the step of:
   transmitting the actual values, the concordance or the discordance, to an inspection unit; and
   displaying the actual values, the concordance or the discordance, by way of a display of the inspection unit.

15. The method according to claim 10, wherein the sensor is associated with at least one setpoint value of the human operator.

* * * * *